(12) United States Patent
Chung

(10) Patent No.: US 7,562,654 B2
(45) Date of Patent: Jul. 21, 2009

(54) BARBECUE STOVE

(76) Inventor: Kiosky Chung, 8F-1, No. 497, Jhongming S. Rd., West District, Taichung City (TW) 403

( * ) Notice: Subject to any disclaimer, the term of this patent is extended or adjusted under 35 U.S.C. 154(b) by 562 days.

(21) Appl. No.: 11/339,858

(22) Filed: Jan. 26, 2006

(65) Prior Publication Data

US 2007/0169767 A1    Jul. 26, 2007

(51) Int. Cl.
*A47J 37/00* (2006.01)
*A47J 37/07* (2006.01)

(52) U.S. Cl. .................................. 126/25 A; 126/25 R

(58) Field of Classification Search ............... 126/25 R, 126/25 A, 25 AA
See application file for complete search history.

(56) References Cited

U.S. PATENT DOCUMENTS

| 2,047,979 | A | * | 7/1936 | Mills | 126/41 E |
| 2,262,692 | A | * | 11/1941 | Meacham | 126/39 C |
| 2,477,546 | A | * | 7/1949 | Reeves | 99/446 |
| 3,048,162 | A | * | 8/1962 | Gauss | 126/25 A |
| 3,088,395 | A | * | 5/1963 | Miller | 99/340 |
| 5,458,053 | A | * | 10/1995 | Hsiao | 99/444 |
| 6,357,434 | B1 | * | 3/2002 | Bossler | 126/25 A |
| 6,363,925 | B1 | * | 4/2002 | Chavana et al. | 126/25 A |

FOREIGN PATENT DOCUMENTS

JP     10-94486     *   4/1998

* cited by examiner

*Primary Examiner*—Carl D Price
(74) *Attorney, Agent, or Firm*—Banger Shia

(57) ABSTRACT

A barbecue stove includes a bowl for installment on the ground, a food tray for supporting food, a coal tray for supporting coal and an elevator for adjusting the elevation of the coal tray. The food tray is installed on the bowl. The coal tray is positioned in the bowl below the food tray. The elevator is provided between the coal tray and the bowl.

11 Claims, 6 Drawing Sheets

BARBECUE STOVE

BACKGROUND OF INVENTION

1. Field of Invention

The present invention relates to a barbecue stove based on coal and, more particularly, to an elevator for adjusting the elevation of a coal tray instead of a food tray of such a barbecue stove.

2. Related Prior Art

Barbecue parties are popular outdoor gatherings because they allow a lot of people to take part in. In a barbecue party, the primary device is a barbecue stove. There are various barbecue stoves based on various fuels including coal. A typical barbecue stove based on coal includes a bowl, a coal tray positioned in the bowl for supporting coal and a food tray installed on the bowl for supporting food. Thus, the food on the food tray can be barbecued with the fire due to the burning of the coal on the coal tray. The coal tray provides good circulation of air so that the burning of the coal on the coal tray can be complete. In the typical barbecue stove, the flame due varies as time goes by. In initial and final phases, the flame is weak. In an intermediate phase, the flame is intense. Therefore, the food has to be cooked longer in the initial and final phases than in the intermediate phase. The food cooked in the initial and final phases generally contains little water and is too tough to eat. The food cooked in the intermediate phase is often scorched and too awful to eat.

There have been devised various barbecue stoves wherein the elevation of a food tray can be adjusted relative to a coal tray based on the thickness of the food and desired degrees of the cooking of the food. Such barbecue stoves can be found, for example, in Taiwanese Patent Publication Nos. 552917, 433035 and 422064. In each of the barbecue stoves, the food tray is moved toward or from the coal tray so that food tends to fall from the food tray. Moreover, they include complicated structures and entail high costs.

The present invention is therefore intended to obviate or at least alleviate the problems encountered in prior art.

SUMMARY OF INVENTION

It is an objective of the present invention to provide a barbecue stove for cooking food of consistent quality.

It is another objective of the present invention to provide an inexpensive barbecue stove.

To achieve the foregoing objectives, a barbecue stove is provided with a coal tray that can be moved toward and from a food tray.

According to the present invention, a barbecue stove includes a bowl, a food tray installed on the bowl and a coal tray positioned under the food tray in the bowl.

An elevator is used for the coal tray in the bowl. The elevator includes two cranks positioned beneath the coal tray in the bowl and a handle for rotating the cranks, thus adjusting the elevation of the coal tray The bowl defines a vertical slot and several holes in communication with the slot. The handle is inserted through the slot. The handle includes a first end connected to the cranks in the bowl and a second end exposed from the bowl. A grip is movably installed at the second end of the handle. The handle can be pivoted in order to rotate the cranks. The grip can be located in one of the holes so as to keep the coal tray in one of several positions.

The elevation of the coal tray can be adjusted based on the flame due to the combustion of coal on the coal tray and desired degrees of the cooking of food.

Other objectives, advantages and features of the present invention will become apparent from the following description referring to the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
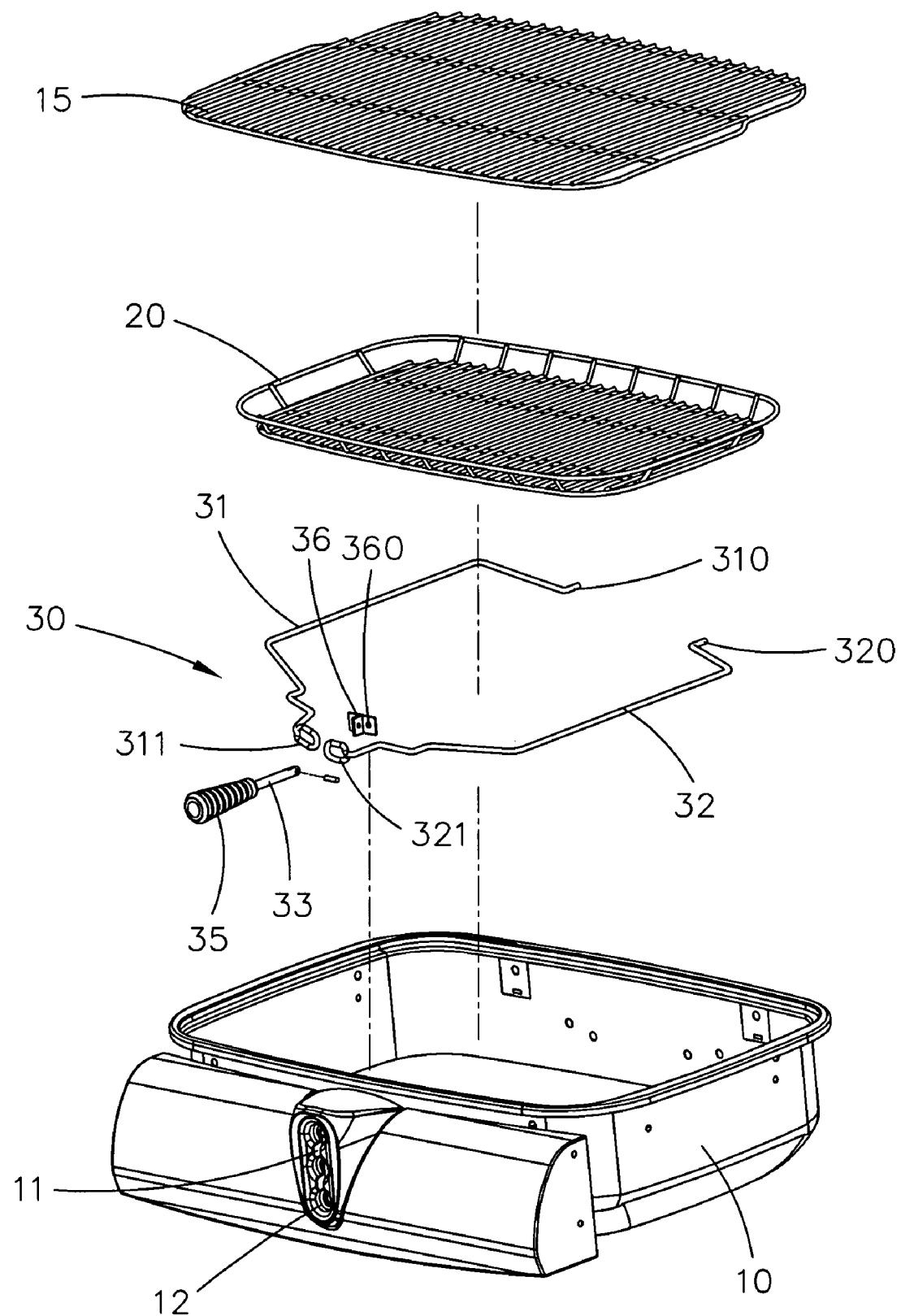
FIG. 1 is an exploded view of a barbecue stove according to the preferred embodiment of the present invention.
Figure 2:
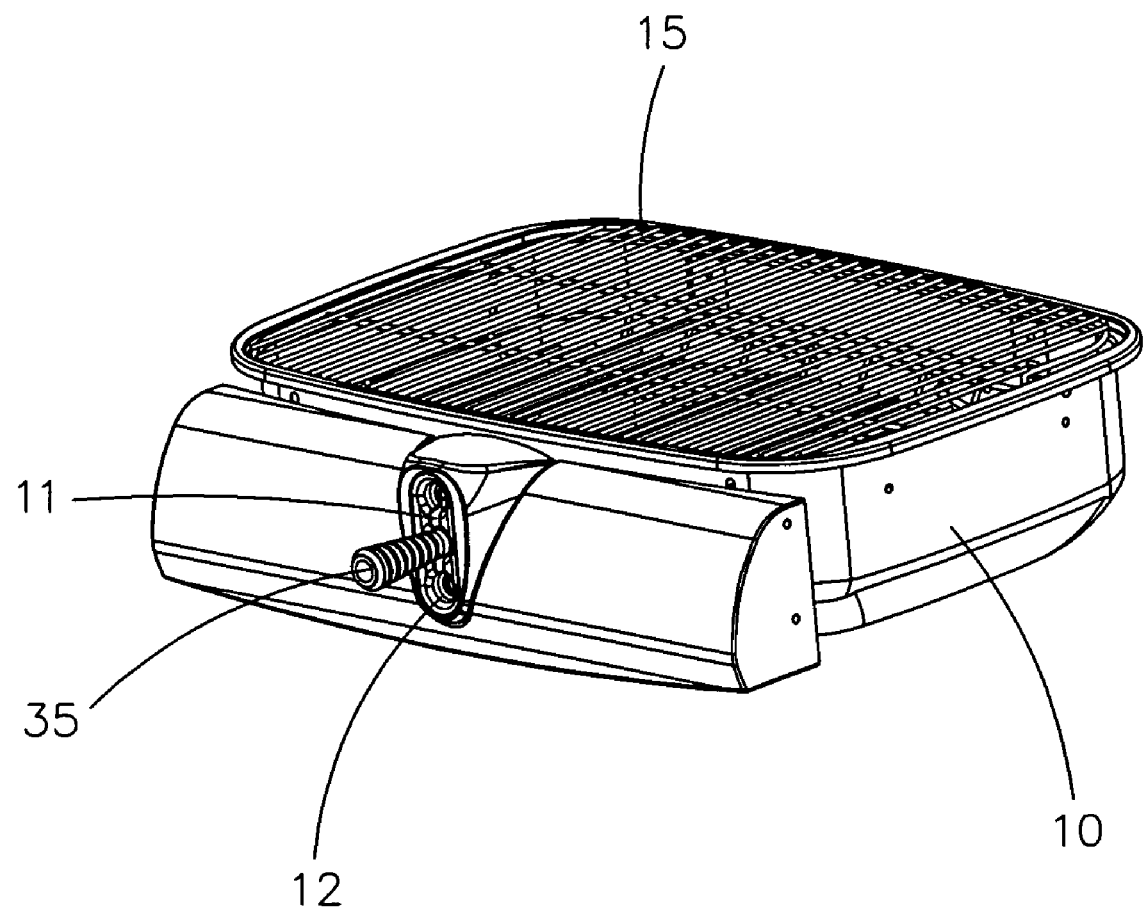
FIG. 2 is a perspective view of the barbecue stove shown in FIG. 1.

Referring to FIGS. 1 and 2, there is shown a barbecue stove according to the preferred embodiment of the present invention. The barbecue stove includes a bowl 10, a food tray 15 installed on the bowl 10, a coal tray 20 positioned in the bowl 10 below the food tray 15 and an elevator 30 for adjusting the elevation of the coal tray 20.

The elevator 30 includes two cranks 31 and 32 and a handle 33. Both of the cranks 31 and 32 are substantially U-shaped. The crank 31 includes a pivot 310 at an end and a loop 311 at another end. The crank 32 includes a pivot 320 at an end and a loop 321 at another end. The pivots 310 and 320 are inserted in apertures defined in the bowl 10 so that the cranks 31 and 32 are pivotally installed in the bowl 10.

The bowl 10 defines a vertical slot 11 and a plurality of apertures 12 in communication with the slot 11. The slot 11 and the apertures 12 are located opposite to the apertures that receive the pivots 310 and 320.

The handle 33 is inserted through the slot 11 and the loops 311 and 321. The handle 33 includes a first end and a second end. The handle 33 is pivotally connected to the bowl 10 by means of a mount 36. The mount 36 includes a middle portion and two lateral portions extending from opposite sides of the middle portion. Each of the lateral portions of the mount 36 defines an aperture 360. Two rivets are driven into a portion 13 of the bowl 10 through the apertures 360 so as to secure the mount 36 to the bowl 10. The first end of the handle 33 is pivotally connected to the middle portion of the mount 36 by means of a pin. The first end of the handle 33 defines a slit for receiving the middle portion of the mount 36.

Figure 3:
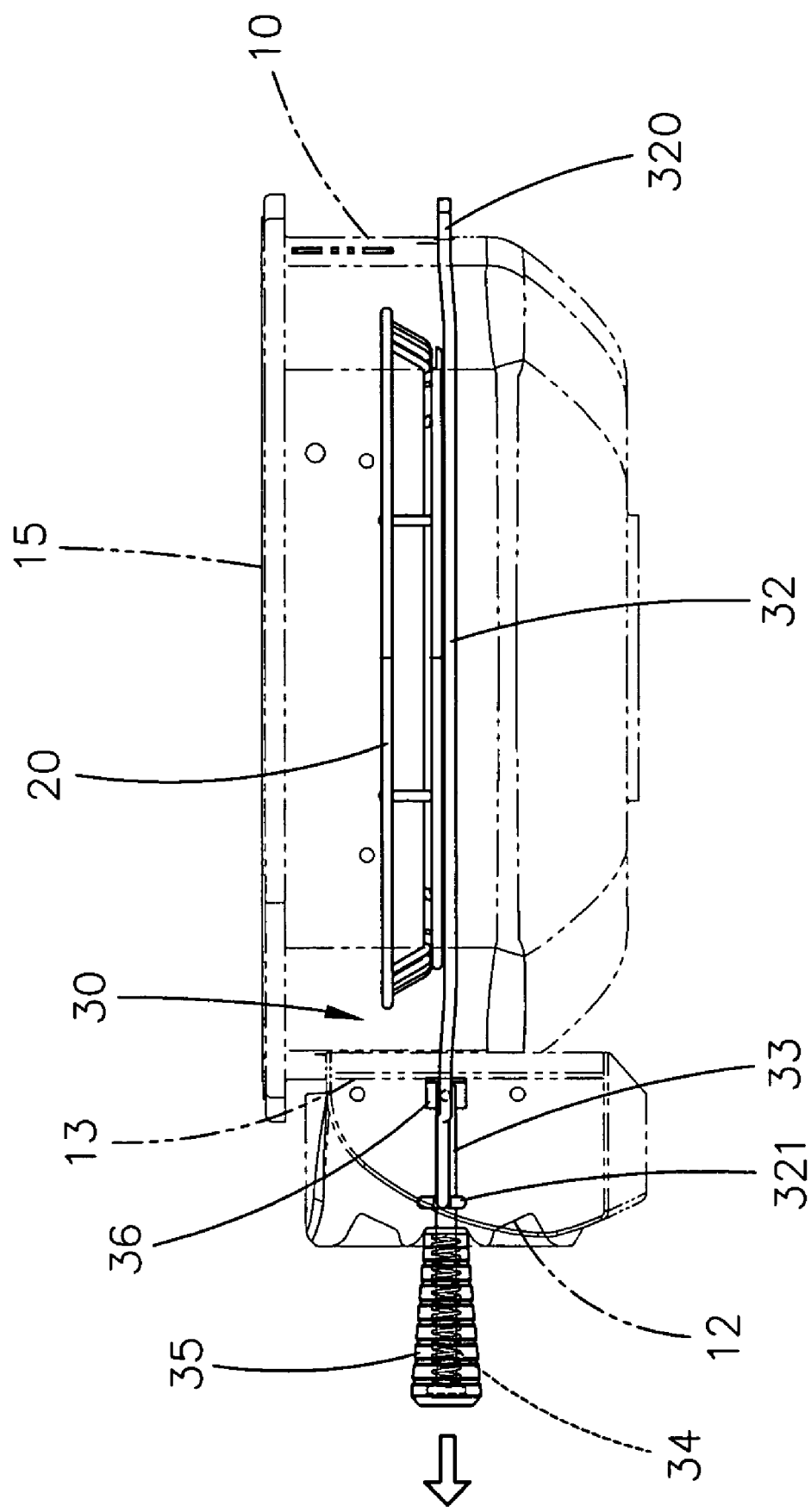
FIG. 3 is a side view of the barbecue stove shown in FIG. 2.

Referring to FIG. 3, a spring 34 is positioned in a hollow grip 35 that is movably installed on the second end of the handle 33. The spring 34 includes an end attached to the handle 33 and an opposite end attached to the grip 35. Normally, the grip 35 is located in one of the apertures 12 so as to retain the cranks 31 and 32 in one of several angular positions.

Figure 4:
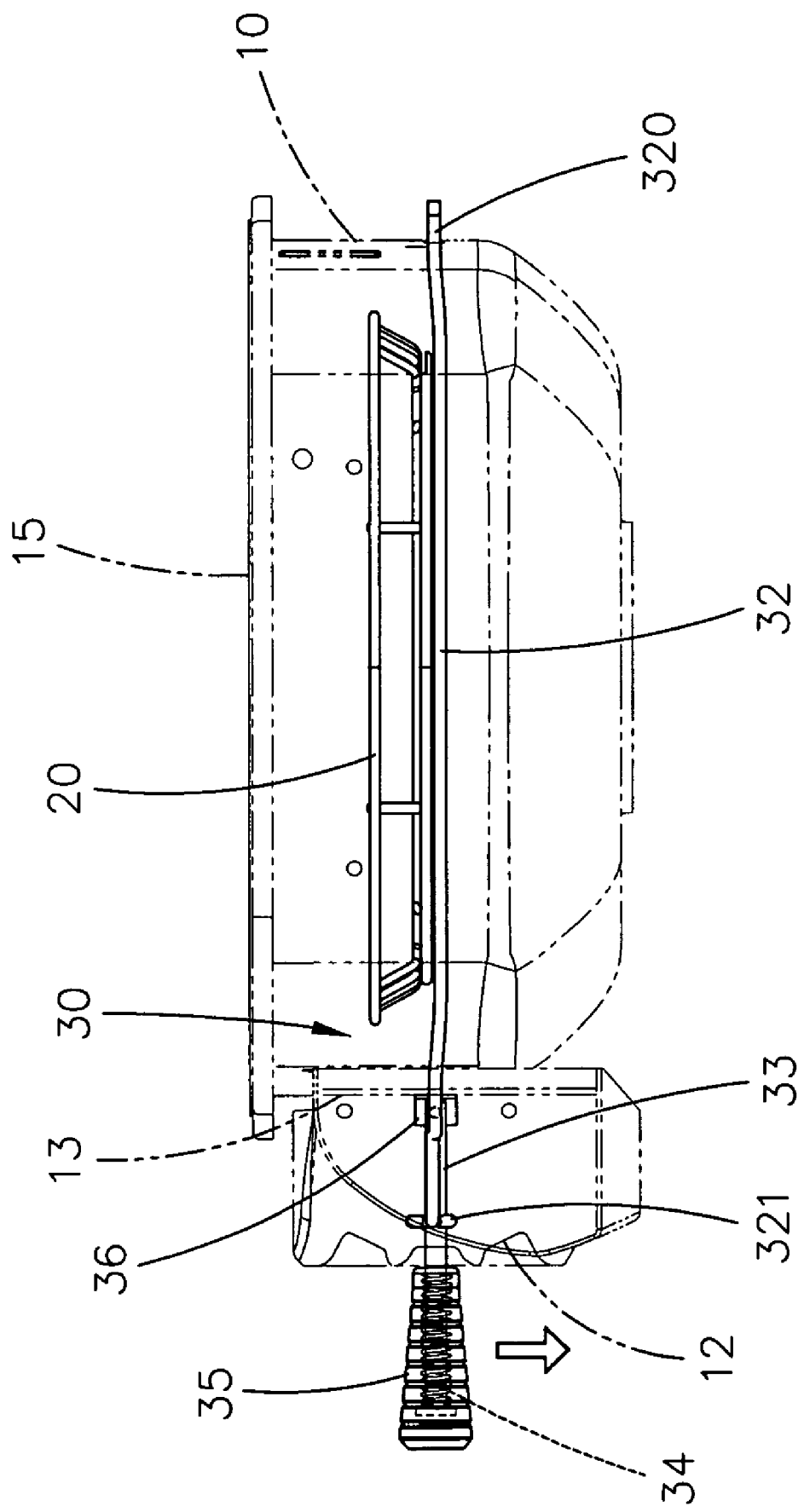
FIG. 4 is a side view of the barbecue stove in another position than shown in FIG. 3.

Referring to FIG. 4, the grip 35 is pulled from the apertures 12 so that the pivoting of the handle 33 in the slot 11 is allowed and that the spring 34 is compressed.

Figure 5:
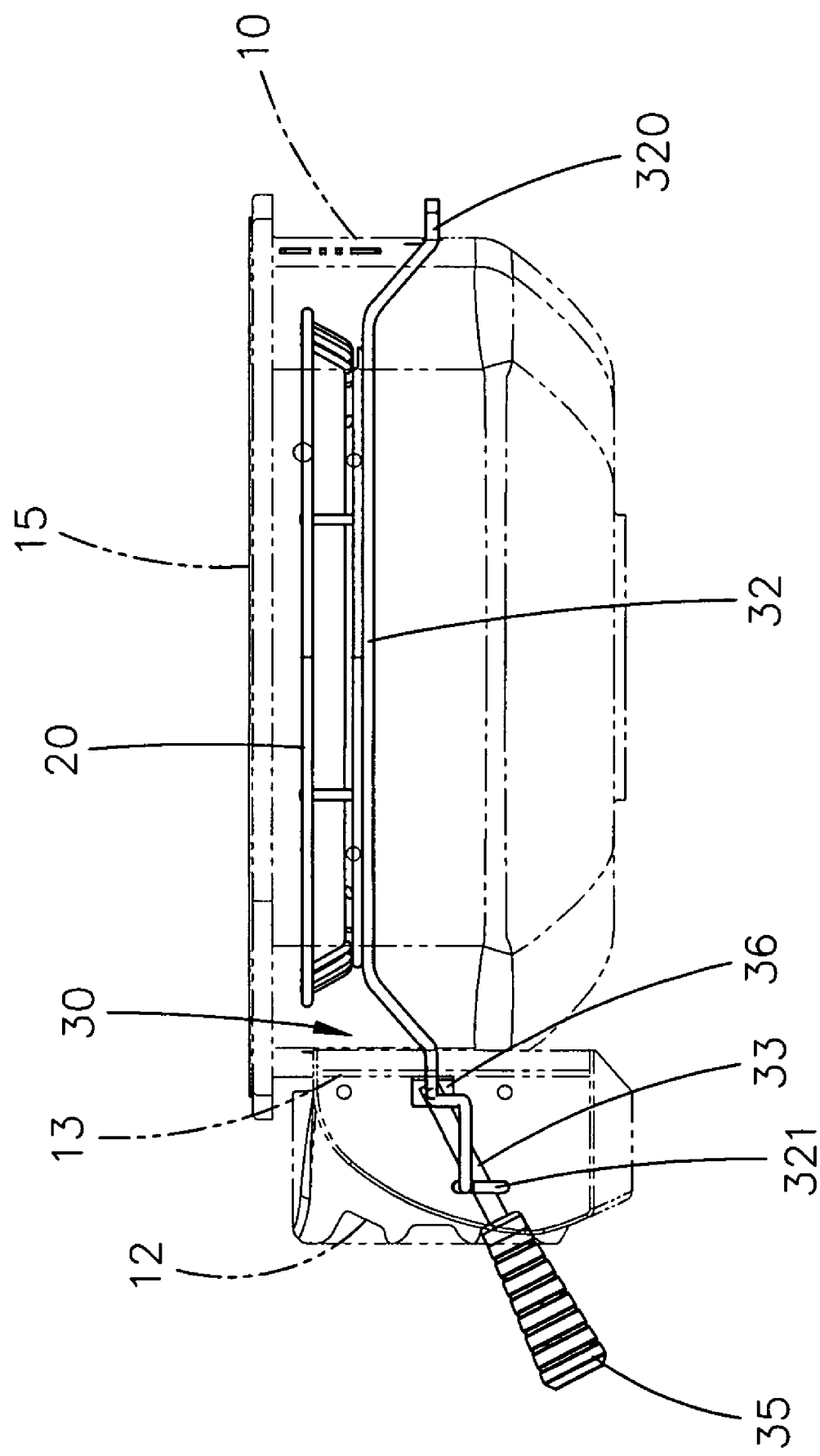
FIG. 5 is a side view of the barbecue stove in another position than shown in FIG. 4.

Referring to FIG. 5, the handle 33 is pivoted down so as to rotate the cranks 31 and 32 so as to lift the coal tray 20. The grip 35 is released so as to allow the spring 34 to push the grip 35 into another one of the apertures 12 so that the coal tray 20 is kept in the lifted position.

Figure 6:
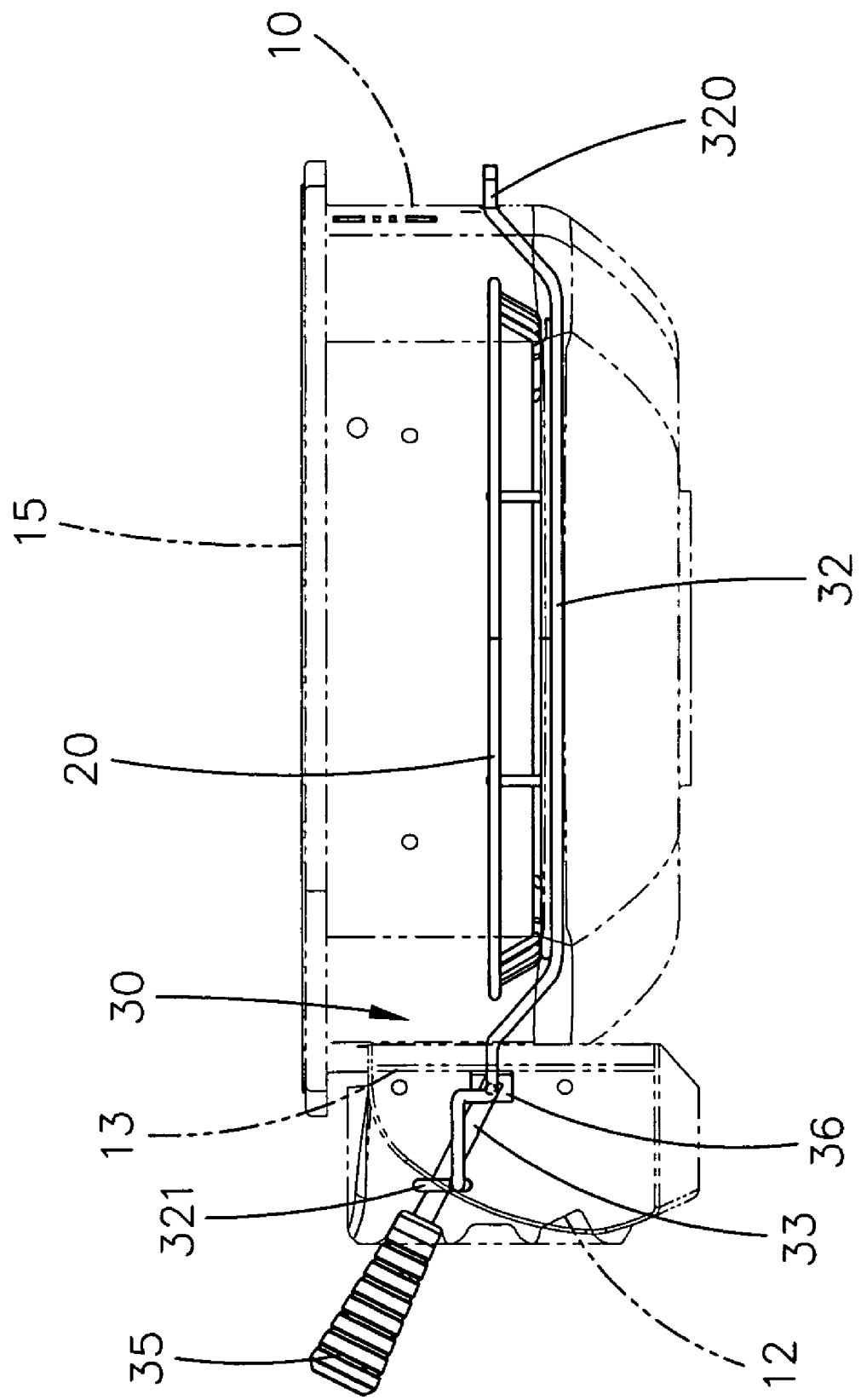
FIG. 6 is a side view of the barbecue stove in another position than shown in FIG. 5.

Referring to FIG. 6, the handle 33 is pivoted up so as to rotate the cranks 31 and 32 so as to lower the coal tray 20. The grip 35 is released so as to allow the spring 34 to push the grip 35 into still another one of the apertures 12 so that the coal tray 20 is kept in the lowered position.

Although referred to as "trays", the food tray 15 and the coal tray 20 are grids as shown.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A barbecue stove comprising:
   a bowl comprising a slot defined therein and apertures in communication with the slot;
   a food tray installed on the bowl;
   a coal tray positioned in the bowl below the food tray; and
   an elevator comprising:
      two cranks each comprising first and second ends pivotally inserted through the bowl so that the cranks are located beneath the coal tray;
      a handle inserted through the slot and connected to the second ends of the cranks so that the handle is movable along the slot to pivot the cranks to change the elevation of the coal tray; and
      a grip movably installed on the handle between a first position wherein the grip is disposed in one of the apertures to position the handle and a second position where the grip is outside any of the apertures to allow the movement of the handle along the slot.

2. The barbecue stove according to claim 1 wherein each of the cranks comprises a pivot at the first end.

3. The barbecue stove according to claim 1 wherein each of the cranks comprises a loop at the second end, wherein the handle is inserted through the loops of the cranks.

4. The barbecue stove according to claim 1 wherein the handle comprising an end pivotally connected to the bowl and another end connected to the grip.

5. The barbecue stove according to claim 4 wherein the elevator comprises a mount secured to the bowl, wherein the handle is pivotally connected to the mount.

6. The barbecue stove according to claim 1 wherein the elevator comprises a spring provided between the grip and the handle for biasing the grip towards the first position on the handle.

7. The barbecue stove according to claim 6 wherein the spring is compressed between the grip and the handle.

8. The barbecue stove according to claim 1 wherein the grip is a hollow grip in which the handle is inserted.

9. The barbecue stove according to claim 8 wherein the elevator comprises a spring provided between the grip and the handle for biasing the grip towards the first position on the handle.

10. The barbecue stove according to claim 9 wherein the spring is compressed between the grip and the handle.

11. The barbecue stove according to claim 9 wherein the spring is positioned in the grip.

* * * * *